United States Patent
Kobayashi et al.

(10) Patent No.: US 7,062,450 B2
(45) Date of Patent: Jun. 13, 2006

(54) SYSTEM AND PROGRAM FOR AFFORESTATION AND/OR REFORESTATION BUSINESS

(75) Inventors: Yoshikazu Kobayashi, Tokyo (JP); Ryo Soda, Kashiwa (JP); Kenji Matsune, Tsukuba (JP)

(73) Assignee: Sumitomo Forestry Co., Ltd., Osaka (JP)

( * ) Notice: Subject to any disclaimer, the term of this patent is extended or adjusted under 35 U.S.C. 154(b) by 112 days.

(21) Appl. No.: 10/505,937

(22) PCT Filed: Nov. 18, 2003

(86) PCT No.: PCT/JP03/14679

§ 371 (c)(1),
(2), (4) Date: Aug. 30, 2004

(87) PCT Pub. No.: WO2004/046986

PCT Pub. Date: Jun. 3, 2004

(65) Prior Publication Data

US 2005/0087110 A1    Apr. 28, 2005

(30) Foreign Application Priority Data

Nov. 18, 2002 (JP) ............................. 2002-333526

(51) Int. Cl.
*G06F 17/60* (2006.01)

(52) U.S. Cl. ........................................ 705/10; 705/500
(58) Field of Classification Search ................ 111/200, 111/100–105, 114–117; 37/301–303, 195, 37/466; 701/50; 705/10, 7, 1, 400, 500
See application file for complete search history.

(56) References Cited

FOREIGN PATENT DOCUMENTS

| JP | 2002-073911 | 3/2002 |
| JP | 2002-117243 | 4/2002 |
| JP | 2002-203036 | 7/2002 |

*Primary Examiner*—Christopher J. Novosad
(74) *Attorney, Agent, or Firm*—Blank Rome LLP

(57) ABSTRACT

An afforestation and/or reforestation business system, which is capable of devising and evaluating an afforestation and/or reforestation business is provided. The system includes a communication system capable of communicating between a terminal at the business center and a terminal at respective local sites, a first database for storing records related to the afforestation and/or reforestation business, a second database for storing records related to tree species and the site information, a site determining portion for evaluating the proposed afforestation and/or reforestation sites using estimated carbon dioxide absorption amounts to be obtained by executing an afforestation and/or reforestation business, and a business plan determining portion for determining an afforestation and/or reforestation business by selecting an appropriate tree species and an appropriate area that can obtain the greatest profit and the greatest carbon absorption amount from the site.

13 Claims, 3 Drawing Sheets

SYSTEM AND PROGRAM FOR AFFORESTATION AND/OR REFORESTATION BUSINESS

CROSS-REFERENCE

The present invention is based on Japanese Patent Application No. 2002-333526 filed Nov. 18, 2002, and the content of which is incorporated herein by reference.

1. Technical Field

The present invention relates to a system and program for devising and evaluating an afforestation and/or reforestation business.

2. Background Art

Conventionally, it has been known to establish a business plan for an afforestation and/or reforestation business by estimating the future forest according to simulation using a single tree species. Since an afforestation and/or reforestation business takes a long time over several tens of years from start to completion of the business, simulation by computer is effective for planning an afforestation and/or reforestation business for optimizing the business plan.

Furthermore, it is possible to estimate the state of the future forest and an amount of trees accumulated in the forest after a certain number of years by managing the forest so as to satisfy a predetermined relationship between the number of trees per unit area and the age of trees, in accordance with a known thinning method of needle-leaf-trees, as shown in Japanese Patent Application, First Publication No. Hei 5-111335.

Recently, afforestation and/or reforestation business is attracting attention as a useful CDM business. CDM is an abbreviation of "Clean Development Mechanism", which is mandated in the Kyoto Protocol under the United Nations Framework Convention, in which a developed country, which has a target amount of reduced emission of greenhouse effect gas, acquires the amount of reduced gas in developing countries. The afforestation and/or reforestation business is one of the candidates in a plurality of greenhouse gas reduction businesses in developing countries, as described in Journal of Nikkei Ecology Magazine October 2002, published by Nikkei Shinbunsha, entitled "Progress of Clean Development Mechanism, Development of New Countermeasures for Preventing Global Warming and Increase of Business Opportunities".

An object of an afforestation and/or reforestation business is to grow trees that can be sold at a high price when they are cut. Therefore, it seems profitable to plant over a wide area a selected tree species, which can grow fast and which can be sold at high prices when they are cut. However, the price of wood fluctuates depending on a balance between demand and supply, and the market price for a certain tree is not necessarily high at the time of felling. In addition, when cutting of tress is intentionally delayed waiting for a rise in the price of wood, the wood price may be reduced because of deterioration of the forest. The value of wood generally traded at a high price may also sometimes be deteriorated because of damage by insects or some other natural disasters.

Although an afforestation and/or reforestation business is attracting attention as an effective measure against global warming, it is important in the business plan to maximize the amount of carbon absorbed by trees in the afforestation and/or reforestation site as they grow in order to counter against global warming. At the same time, it is important to select an appropriate afforestation and/or reforestation site and select a tree species suitable for the afforestation and/or reforestation site. Also, the afforestation and/or reforestation business plan must include an evaluation of the carbon absorbed by the forest, and based on the amount of carbon absorbed, it can be determined whether the afforestation and/or reforestation business is appropriate in such an area.

Therefore, it is an object of the invention to establish a new system and a new program for planning and executing an afforestation and/or reforestation business, considering the global warming problem so as to improve the conventional systems and programs.

SUMMARY OF THE INVENTION

It is an object of the present invention to provide a systems and a program for planning an afforestation and/or reforestation business plan and for evaluating the afforestation and/or reforestation business.

According to one aspect of the present invention, an afforestation and/or reforestation business system comprising, a plurality of proposed afforestation and/or reforestation sites, a computer server in data communication with at least one terminal installed where the afforestation and/or reforestation is carried out, the computer server adapted to devise and evaluate an afforestation and/or reforestation business, a first data base for storing records related to the afforestation and/or reforestation business, a second data base for storing records related to tree species, information-collection portion for collecting a diameter and a height of a tree located within a local region in at least one of the plurality of proposed afforestation and/or reforestation sites, wherein the diameters and heights afforestation and/or reforestation input into at least one terminal, an afforestation and/or reforestation site determining portion for evaluating the proposed afforestation and/or reforestation site using estimated tree carbon dioxide absorption amount based on the tree diameter and height information, comparing portion for selecting an afforestation and/or reforestation site from the plurality of proposed afforestation and/or reforestation sites, wherein the selection includes comparing the estimated carbon dioxide amounts to a first threshold value, planning portion for calculating a profit when a planting area in the selected afforestation and/or reforestation site and tree species records change, the planning portion including selecting a tree species, selecting the planting area that can obtain the greatest profit, and storing the selected tree species, the planning area, and estimated value for growth change of the selected tree species in the first database, and output portion for displaying said afforestation and/or reforestation business records on the at least one terminal.

The other aspect of the present invention is an afforestation and/or reforestation business system according to the above aspect, further comprising, indirect effect memory portion for storing information relating to an indirect effect of an environment of the selected afforestation and/or reforestation site and a scale value of the afforestation and/or reforestation site obtained by prior investigations, risk memory portion for storing risk information relating to the environment of the selected afforestation and/or reforestation site and the scale value of the afforestation and/or reforestation obtained by prior investigations, indirect effect estimating portion for inputting a business value corresponding to the indirect effect and scale value, and for inputting from the first database and from the indirect effect memory portion and storing it in said business database; and risk estimating portion for inputting the business value of risks corresponding to the scale of the afforestation and/or reforestation business and the afforestation and/or reforestation site, read from the first database, from the risk memory portion, and stores the same in said first database.

Still other aspect of the present invention is the afforestation and/or reforestation business system according to the above aspect further comprising, indirect effect collecting portion for receiving and collecting, via the at least one terminal, condition information relating to the indirect effect estimates, risk collecting portion for receiving and collecting, via the at least one terminal, condition information relating to the risk estimates, business accomplishment status determining portion for receiving the condition information and comparing it with estimate values and business values and calculating a proportion of conditions with respect to said business, and business review portion for reviewing and revising the afforestation and/or reforestation business, wherein the indirect effect estimating portion and risk estimating portion are adapted to re-compute the indirect effect and the risk estimates when the business review portion revises the afforestation and/or reforestation business.

Still other aspect of the present invention is the afforestation and/or reforestation business system according to the above aspect, further comprising, a second threshold value that is smaller than the first threshold value, wherein if the tree carbon dioxides absorption amount is smaller than the first threshold value, wherein if the tree carbon dioxide absorption amount is smaller than the first threshold value and greater than the second threshold value, a second class forest is cut and qualifies as an afforestation and/or reforestation site for new afforestation and/or reforestation.

Still other aspect of the present invention is the afforestation and/or reforestation business system comprising: a plurality of proposed afforestation and/or reforestation sites, computer server in data communication with at least one terminal installed where afforestation and/or reforestation is carried out, the computer server adapted to devise and evaluate an afforestation and/or reforestation business, a first data base for storing records related to the afforestation and/or reforestation business; a second data base for storing records related to tree species, information collection portion for collecting a diameter and a height of all trees located within a local region in a plurality of afforestation and/or reforestation candidate sites, wherein the diameters and heights are input into the at least one terminal, an afforestation and/or reforestation site determining portion for performing a predetermined calculation to determine an average tree carbon dioxide absorption amount per unit volume at a predetermined time in a plurality of afforestation and/or reforestation sites based on the tree diameters and heights information, selection portion for selecting an afforestation and/or reforestation candidate site from the plurality of afforestation and/or reforestation candidate sites by comparing the determined average tree carbon dioxide absorption amount per unit volume to a first threshold amount, selecting an afforestation and/or reforestation candidate site, and outputting the diameters and heights information of trees in the selected afforestation and/or reforestation candidate site, a first computing module adapted to receive the tree diameters and heights information and calculate future average diameters and heights, a second computing module adapted to determine a distribution of the number of trees and heights of trees corresponding to pre-selected tree diameters, a third computing module adapted to determine a volumes of logs for each tree diameter per unit area of the selected afforestation and/or reforestation candidate site based on the determined distribution of the number of trees and heights of trees, a fourth computing module adopted to multiply an afforestation and/or reforestation site area by the determined volume of logs per unit area, thereby determine a volume of logs of the entire selected afforestation and/or reforestation site, and adapted to multiply the volume of logs of the entire selected afforestation and/or reforestation sites by a log price for each pre-selected tree diameter, thereby determining an economic value for the entire selected afforestation and/or reforestation sites; computation portion for executing the first, second, third, and fourth computing modules for each type of tree stored in said second database to compute a second economic value of the entire selected afforestation and/or reforestation site volume changes, and for selecting a tree species and afforestation and/or reforestation site volume that obtains an optimal economic value determined by said fourth computing module, and for storing the selected tree species, a planting area, and an estimated value for growth change of the selected tree species in the first database; and a business output portion for displaying said afforestation and/or reforestation business records on the at least one terminal.

Still other aspect of the present invention is the computer-implemented afforestation and/or reforestation program for implementing the afforestation and/or reforestation business system according to the above aspect.

Still other aspect of the present invention is a computer-implemented afforestation and/or reforestation business program operated on a afforestation and/or reforestation business system comprising a computer server in data communication with at least one terminal located at an afforestation and/or reforestation site, the computer server comprising a first database for storing afforestation and/or reforestation business information and a second database for storing tree species information, and wherein the computer server is adapted to analyze an afforestation and/or reforestation business, the afforestation and/or reforestation business program comprising, a condition information collecting module adapted to receiving from the at least one terminal a diameter and a height of a tree located in a local region within a plurality of afforestation and/or reforestation candidate sites, an afforestation and/or reforestation site determining module adopted to determine a tree carbon dioxide absorption for each of the plurality of afforestation and/or reforestation candidate sites using the diameter and height of the tree information, wherein the afforestation and/or reforestation site determining module selects an afforestation and/or reforestation candidate site if the tree carbon dioxide absorption amount is smaller than a first threshold value, a business devising module adapted to determine a profit when a planning area within the selected afforestation and/or reforestation site and information about tree species within the selected afforestation and/or reforestation site area changed, and that is adapted to select the tree species and the planting area that maximize a profit, and is adapted to store the selected tree species, planting area, and an estimated values for growth changes of the tree species s in the first database, and a business output module adapted to display the information stored in the first database on at least one terminal.

Still other aspect of the present invention is the afforestation and/or reforestation business program according to the above aspect, further comprising a second threshold value that is smaller than the first threshold value, wherein if the tree carbon dioxide absorption amount is smaller than the first threshold value and greater than the second threshold value, a second class forest is cut and qualifies as a afforestation and/or reforestation site for new afforestation and/or reforestation.

Still other aspect of the present invention is the afforestation and/or reforestation business program according to the above aspect, further comprising, an indirect effect memory module adapted to store information relating to the indirect effects of an environment on the selected afforestation and/or reforestation site and a scale of the afforestation and/or reforestation obtained in a previous analysis, afforestation and/or reforestation risk memory module adapted to store risk information related to the environment and the scale of the afforestation and/or reforestation obtained in a previous analysis, an indirect effect estimating module for inputting the indirect effects information and storing the same in the first database, and afforestation and/or reforestation risk estimating module for inputting the risks information and storing the same in the first database.

Still other aspect of the present invention is the afforestation and/or reforestation business program according to the above aspect, further comprising, an indirect effect collecting module adapted to receive and collect indirect information from the at least one terminal, afforestation and/or reforestation risk collecting module adapted to receive and collect risk information from the at least one terminal, a business accomplishment assessment module adapted to receive indirect effect information and risk information from the condition information collecting module, the indirect effect information collecting module, and the risk information collecting module, and adapted to determine a status value, and a business review module adopted to store the status value in the first database if the afforestation and/or reforestation business is incomplete, wherein the indirect effect estimating module and risk estimating module compute a revised indirect effect information and risk information.

Still other aspect of the present invention is a method for afforestation and/or reforestation comprising the steps of:

(a) selecting a plurality of proposed afforestation and/or reforestation sites;

(b) providing a computer server in data communication with at least one terminal installed where afforestation and/or reforestation is carried out, the computer server adapted to devise and evaluate a afforestation and/or reforestation business;

(c) providing a first database for storing records related to the afforestation and/or reforestation business;

(d) providing a second database for storing records related to tree species;

(e) collecting a diameter and a height of a tree located within a local region in at least one of the plurality of proposed afforestation and/or reforestation sites;

(f) inputting the diameters and heights into at least one terminal;

(g) estimating tree carbon dioxide absorption amount based on tree diameter and height information:

(h) comparing the estimated carbon dioxide absorption amount to a first threshold value;

(i) selecting an afforestation and/or reforestation site from a plurality of proposed afforestation and/or reforestation sites based on the comparison step in step (h);

(j) calculating profit when a planting area in the selected afforestation and/or reforestation site and the tree species record change by, (k) selecting a tree species;

(l) selecting the planting area that can obtain a maximum profit, and (m) storing the selected tree species, the planting area, and an estimated value for growth change of the selected tree species in the first database; and (n) output portion for displaying said afforestation and/or reforestation business records on the at least one terminal;

Still other aspect of the present invention is the method according to the above aspect further comprising the steps of, (o) storing information relating to an indirect effect of an environment of the selected afforestation and/or reforestation site and a scale of the afforestation and/or reforestation obtained by prior investigations;

(p) storing risk information relating to the environment of the selected afforestation and/or reforestation site and the scale value of the afforestation and/or reforestation obtained by prior investigations;

(q) inputting a business value corresponding to the indirect effect and scale value, and for inputting from the first database and from the indirect effect memory portion and storing it in said business database; and (r) inputting the business value of risks corresponding to the scale of the afforestation and/or reforestation business and the afforestation and/or reforestation site, read from the first database, from the risk memory portion, and stores the same in said first database.

Still other aspect of the present invention is the computer-implemented afforestation and/or reforestation business system comprising, a plurality of proposed afforestation and/or reforestation sites defined by a geographical area, at least one terminal located proximate the plurality of proposed afforestation and/or reforestation sites, wherein at least one terminal is adapted to receive information about at least one tree located within a portion of at least one of the plurality of proposed afforestation and/or reforestation sites, a computer in data communication with the at least one terminal, a first computation module adapted to compute a tree $CO^2$ absorption rate based on the information about the at least one tree, a second computation module adapted to comparing the $CO^2$ absorption rate to a predetermined value and selecting at least one afforestation and/or reforestation site from a plurality of proposed afforestation and/or reforestation sites, a third computation module for calculating a profit based on the tree species in the selected afforestation and/or reforestation site, the third computation module receiving as input information a tree species, a size of a planting area within the selected afforestation and/or reforestation site that can obtain a maximum profit, and an estimated value for the growth change of the tree species; and an output for displaying at least the calculated result.

BEST MODE FOR CARRYING OUT THE INVENTION

A preferred embodiment of the afforestation and/or reforestation business system and the afforestation and/or reforestation business program according to the present invention will be described with reference to the attached drawings.

Figure 1:
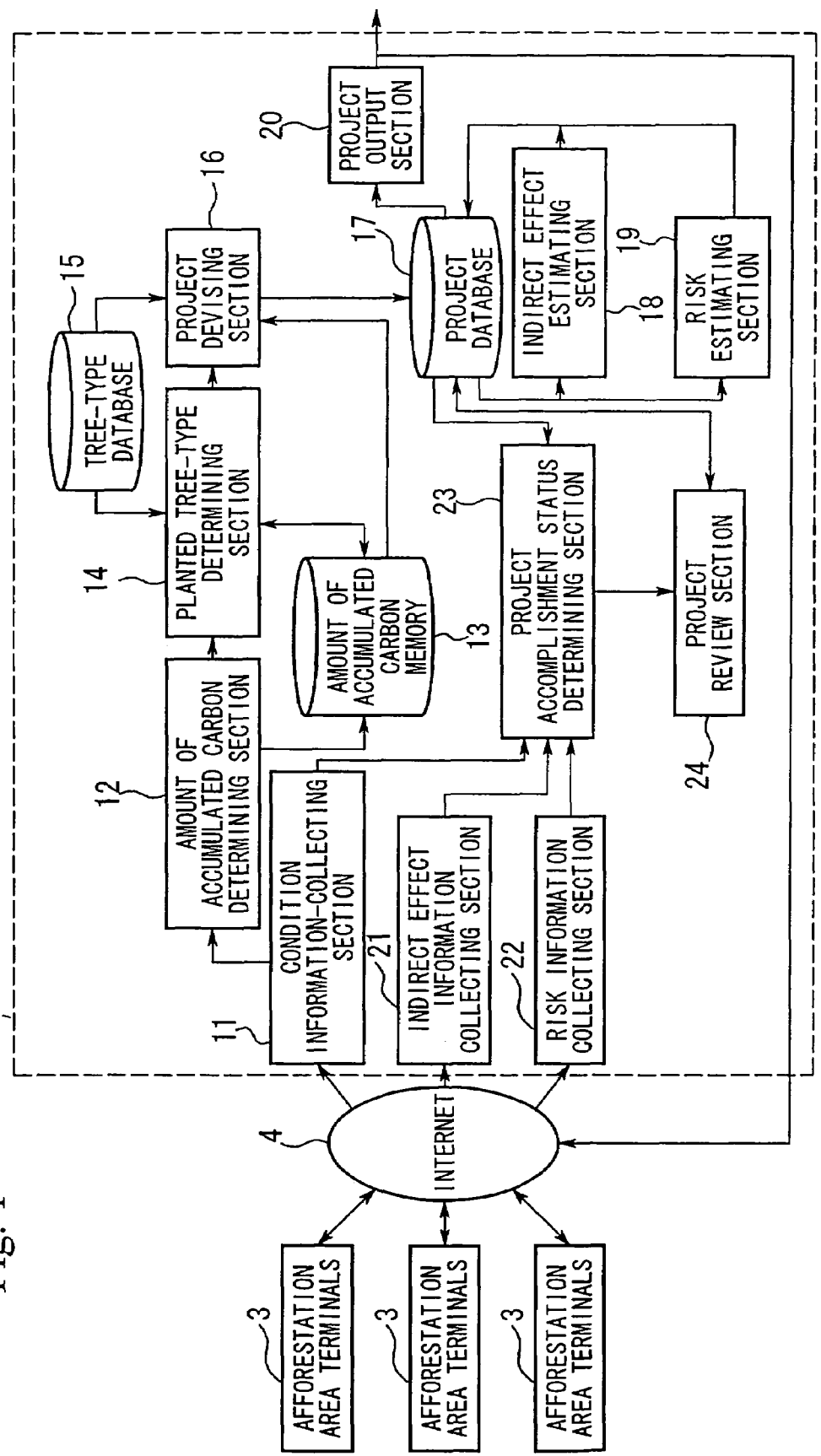
FIG. 1 is a block diagram showing an afforestation and/or reforestation business in accordance with an embodiment of the present invention.

Referring to FIG. 1, the reference numeral 1 denotes an afforestation and/or reforestation business system for planning and evaluating the afforestation and/or reforestation business system and comprises a computer server. Reference numeral 3 denotes site terminals of the afforestation and/or reforestation business, each of which is owned by an individual or business operator, who is engaged in forestry operations at the afforestation and/or reforestation site. FIG. 1 shows, as an example, a network having three site terminals 3 and a center terminal 4, that allows the site terminals 3 to communicate with the afforestation and/or reforestation system via the Internet.

Reference numeral 11 denotes a status information collecting portion that collects information regarding the present condition of the forest and the amount of accumulated carbon for each of the site terminals 3. Reference numeral 12 denotes an accumulated carbon amount determination portion that determines, prior to the start of the planning of the afforestation and/or reforestation business, the numerical values of the amount of accumulated carbon for each site, thereby defining the present state of the site based on information collected by the present condition information collecting portion 11. Hereinafter, a value in terms of the amount of accumulated carbon obtained based on a unit volume of tree will be used as an index for representing the present condition of an afforestation and/or reforestation site.

Reference numeral 13 denotes an accumulated carbon amount memory portion that stores the amount of accumulated carbon, which is determined by the accumulated carbon amount determination portion 12. Reference numeral 14 denotes a planting tree species determining portion that determines a type of tree (tree species) for planting in an afforestation and/or reforestation site based on the amount of accumulated carbon in a particular afforestation and/or reforestation site stored in the accumulated carbon amount memory portion 13. Reference numeral 15 denotes a tree species data base which stores data relating to the afforestation and/or reforestation sites, and information regarding a tree species and associated data of the tree species, such as the amount of carbon accumulation per unit volume. Reference numeral 16 denotes a business planning portion of the afforestation and/or reforestation business, which plans an afforestation and/or reforestation business plan in an area by simulation computation for maximizing the amount of carbon accumulated in the area based on tree species database 15 with reference to the information regarding a tree species and an accumulated carbon amount of the tree species per unit volume of the tree. Reference numeral 17 denotes a business plan database that stores a variety of plans for the afforestation and/or reforestation business obtained by the business planning portion 16.

Reference 18 is an indirect effect estimating portion that estimates indirect effects and additionally stores results of estimation of indirect effects into the business plan database 17 while carrying out the afforestation and/or reforestation business plan based on an afforestation and/or reforestation business plan that is stored in the business database 17. The indirect effects in an afforestation and/or reforestation business include loss of wood or loss of accumulating carbon due to such things as illegal felling. Reference numeral 19 denotes an afforestation and/or reforestation risk estimating portion that predicts a variety of risks which can occur while carrying out the afforestation and/or reforestation business and stores results of the risk predictions into the business plan database 17. The risks during execution of an afforestation and/or reforestation business include loss of wood or loss of accumulated carbon by natural disasters such as, fires, storms or floods. Reference numeral 20 denotes an afforestation and/or reforestation business plan output portion that outputs an afforestation and/or reforestation business plan for a particular area, including indirect effects and risks estimated while carrying out the particular business plan, transmitted from each site terminal 3 through the Internet 4, as data information or display information.

Reference numeral 21 denotes an indirect effect information collecting portion that collects information concerning indirect effects which can occur in an afforestation and/or reforestation site based on the input from site terminals 3. Reference numeral 22 denotes afforestation and/or reforestation risk information collecting portion that collects predicted information concerning risks that can occur while carrying out an afforestation and/or reforestation business in an afforestation and/or reforestation site.

The afforestation and/or reforestation business system includes several portions for reviewing the present condition of the afforestation and/or reforestation business in a particular site, in order to assess a degree of accomplishment of the afforestation and/or reforestation business plan and to review and reconstruct the afforestation and/or reforestation business plan while carrying out the business plan.

Reference numeral 23 denotes a business plan accomplishment assessment portion that assesses information concerning the present condition of an afforestation and/or reforestation site, loss caused by damages due to indirect effects and predicted risks from the present condition information collecting portion 11, the indirect effect information collecting portion 21, and the risk information collecting portion 22, and determines the accomplishment degree in accordance with the afforestation and/or reforestation business plan based on information transmitted from those information collecting portions 11, 21, and 23. Reference numeral 24 denotes a business plan review portion that reviews the afforestation and/or reforestation business plan and the degree of accomplishment of an afforestation and/or reforestation business plan based on the assessment results by the business plan accomplishment assessment portion 23.

Operations for reviewing an afforestation and/or reforestation business plan and to evaluate the afforestation and/or reforestation business at a certain stage of execution with reference to attached drawings is described.

Figure 3:
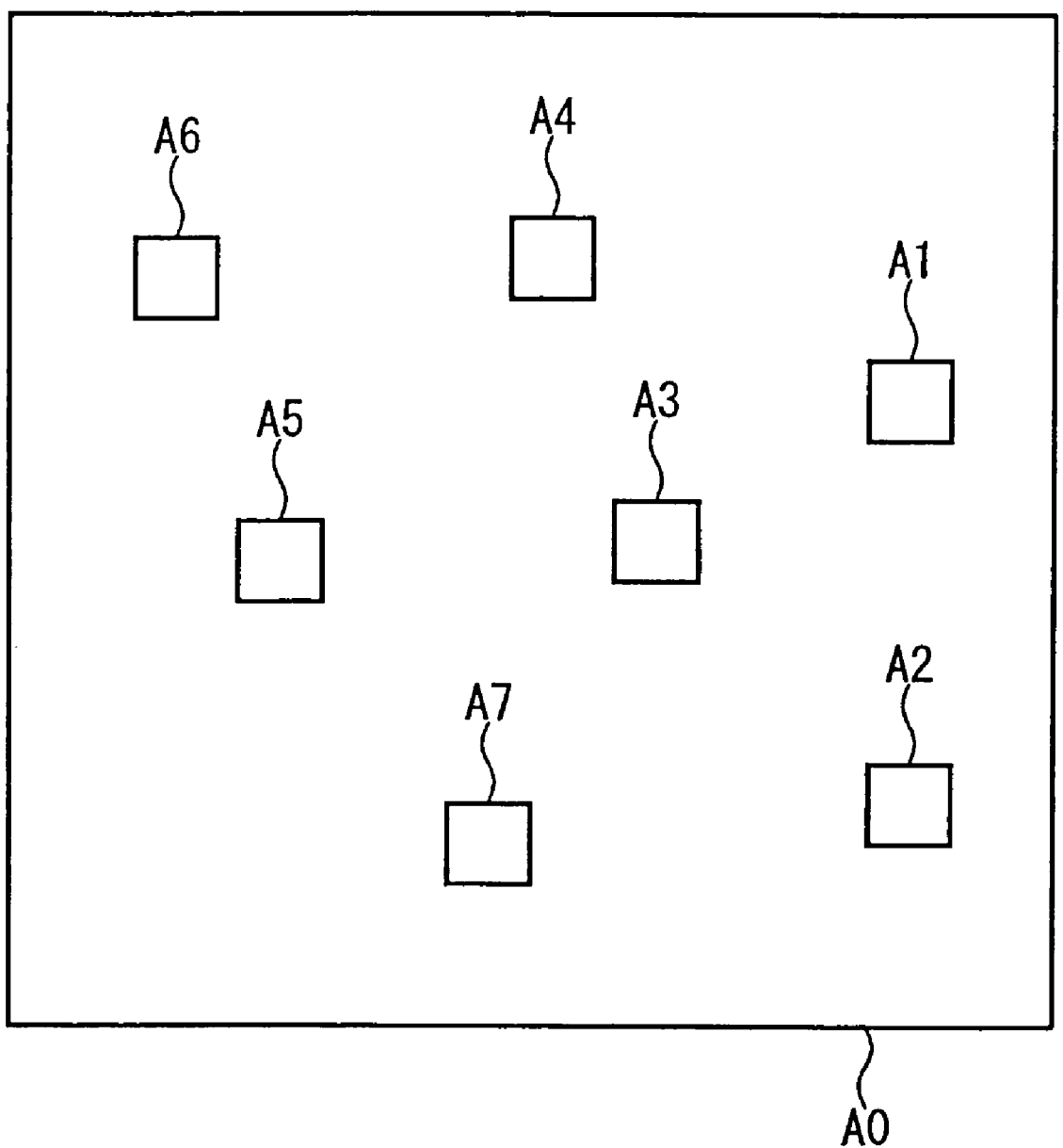
FIG. 3 is an explanatory diagram showing a plurality of afforestation and/or reforestation sites.

A person implementing an afforestation and/or reforestation business first selects a plurality of potential sites suitable for carrying out an afforestation and/or reforestation business and opens an office at each potential site, and at least one terminal is established in each office which is connected to the center terminal 4 through the Internet. The present condition information collecting portion 11 instructs, through the center terminal 4, each site terminal 3 to send information concerning the present state of the forest in the potential site. The afforestation and/or reforestation operator in each site sends through the site terminal 3 to center terminal 4 a survey report of the current condition of the forest in each potential site. In each site, several local regions A1 to A7 having an identical area are randomly selected, as shown in FIG. 3, and the diameters and the heights of all the trees in the respective regions are measured. It is noted that a diameter of tree is measured at a height of the breast from the ground. The diameter measured at breast height is hereinafter called "diameter at the breast height". The survey report on the state of forest includes information concerning the tree diameters at the breast height and heights of trees in the potential afforestation and/or reforestation sites.

Subsequently, the present condition information collecting portion 11 transmits information concerning the present condition of the forest of one site to the accumulated carbon amount determination portion 12. The accumulated carbon amount determination portion 12 determines the accumulated carbon amount by an equation shown below.

A trunk volume V (cm$^3$) of a tree is calculated by the following equation.

$$V = dbh^2 \times h \times 0.3 \qquad (1)$$

In the above equation, dbh is a diameter at the breast height (m) of a tree, and h is height of the tree (m). A trunk weight of a tree can be calculated based on the trunk volume as follows.

$$Wt(\text{dry}) = V \times \rho_0 \qquad (2)$$

Figure 2:
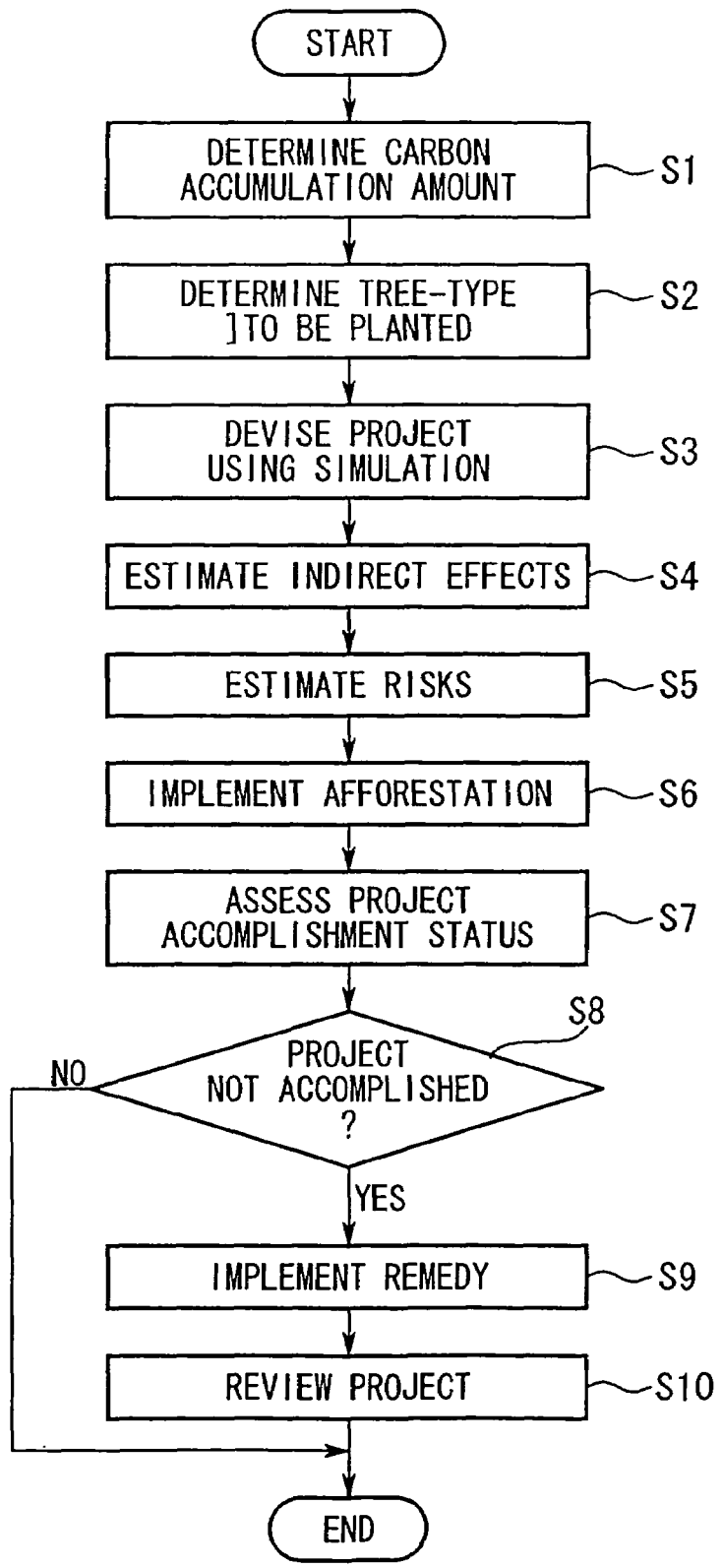
FIG. 2 is a flow chart showing an operation for planning and evaluating of an afforestation and/or reforestation business.

In the above equation, the parameter $\rho_0$ is a density of a tree, which is obtained when the tree has been completely dried at a temperature in a range from 100 to 105° C. until the weight of the tree stops changing. Then, the total carbon content of a tree is obtained by multiplying the weight Wt (dry) of the trunk by a factor of 0.5 to obtain the carbon content of the dried trunk, and further multiplying the carbon content of the dried trunk by an extension coefficient of 1.6 to obtain the total carbon content of the tree including branches and leaves. The carbon content thus obtained is an amount of carbon accumulated so far in a tree. A total carbon content for a local region can be obtained by multiplying the carbon content of a tree by the total number of trees in a local region. This calculation of the total carbon content is carried out for all local regions A1 to A7, and an average amount of the carbon content per unit area Ct (ton/ha) is obtained. The average amount per unit area Ct becomes an accumulated carbon amount in a potential site $A_0$ (FIG. 2, step S1). Since the accumulated carbon amount of a site is proportional to the amount of carbon dioxide absorbed by the trees in the site, the accumulated carbon amount can be converted into the absorbed amount of carbon dioxide by multiplying a predetermined coefficient to the accumulated carbon amount per unit area.

Subsequently, the accumulated carbon amount determining portion 12 compares the accumulated carbon amount per unit area with a predetermined threshold value and classifies potential afforestation and/or reforestation sites into three site types (a) to (c).

Potential afforestation and/or reforestation sites are classified into first, second and third class forest according to the accumulated carbon amount are as follows.

(a) First Class Site

In the case that the amount of carbon accumulated in a forest exceeds 9.6 ton/ha, which corresponds to a first threshold value, this forest is defined as a first class forest and has potential to accumulate large amounts of carbon as time goes by. Since this type of forest is expected to accumulate increasing amounts of carbon in the future, even if the present condition of the forest is maintained, this type of forest should be preserved as it is now.

(b) Second Class Site

When the forest has been turned to a bush and the accumulated carbon per unit area is estimated within a range of 0.6 to 9.6 ton/ha, which is higher than a second threshold value of 0.6 ton/ha but lower than the first threshold value of 9.6 ton/ha, this type of forest is classified as a second class forest in which the accumulated carbon will decrease in the future. Accordingly, this type of forest is selected as a potential site for the afforestation and/or reforestation business.

(c) Third Class Site

When the accumulated carbon amount is estimated to be lower than the second threshold of 0.6 ton/ha, the forest is classified as the third class forest. This type of area is selected as a potential afforestation and/or reforestation area for the afforestation and/or reforestation business.

Subsequently, the accumulated carbon amount determination portion 12 stores information concerning the calculated amount of carbon in potential sites and the classified type of the potential sites in the accumulated carbon amount memory portion 13, and informs the planting tree species determination portion 14 that the accumulated carbon amount determination processing has been completed. Based on the classified types of respective potential afforestation and/or reforestation sites and the calculated amounts of accumulated carbon for potential sites, the second class and the third class sites are determined as potential sites for carrying out afforestation and/or reforestation business.

When potential candidate sites for the next afforestation and/or reforestation business are determined, the planting tree species determining portion 14 reads the stored data in the accumulated carbon amount memory portion 13 and the tree species suitable for the next afforestation and/or reforestation site is determined (FIG. 2, step S2). The tree species is determined with reference to data associated with the tree species stored in the tree species data base 15. The database 15 contains a variety of data of tree species, based on standard growth rate, standard harvest time, standard timber price, population density of trees when planting, standard population density of trees when thinning, degree of risks in the site, whether the soil is suitable for planting, best weather conditions for planting, and average carbon amount. The planting tree species determination portion 14 selects a tree species suitable for the selected site for the afforestation and/or reforestation business with reference to the tree species database 13, and determines the tree species to be planted in the afforestation and/or reforestation site. The planting tree species determination portion 14 transmits notice concerning the determination of the tree species to the afforestation and/or reforestation business planning portion 16.

The afforestation and/or reforestation business planning portion 16 establishes an afforestation and/or reforestation business plan (FIG. 2, step S3). Establishment of the afforestation and/or reforestation business plan is carried out according to simulation results based on program calculation of planting, felling and harvesting.

The afforestation and/or reforestation business plan which is the most appropriate to the object of the business is obtained by the following steps from (1) to (10), based on results of simulation calculations of repetitive planting and harvesting operations for a plurality of tree species, each of which has different growth rate and different harvesting time from each other.

(1) In the first step, a simulation calculation is carried out in order to estimate growth of trees in the site in terms of the average tree height and average tree diameter at the breast height, based on the growth curve of a pre-existing forest in that site, and subsequently, a management program is established for controlling the population density of trees in the afforestation and/or reforestation site according to aging of the forest by reducing the number of trees in the site by thinning. Growth of a tree can be estimated by approximation calculation of the growth curve as shown below.

Assuming that the number of tree species in the site is n, and assuming that the i-th tree species, having an average height of Hi and an average tree diameter at the breast height of Di, grows approximately in compliance with growth curves given by Mitscherlich growth equations shown below.

$$Hi = mi \cdot (1 - Lhi \exp(Ki \cdot t)) \quad (3)$$

$$Di = Mi \cdot (1 - Ldi \exp(Ki \cdot t)) \quad (4)$$

wherein, mi, Lhi, Ki, Mi, and Ldi, and Ki are constants, and t is age of the tree. In order to comply with the actual growth curves of the pre-existing tree species, any growth curves, generally known as Rodistic curves or Gonpelz curves, can be applied for estimating the growth of trees in the site. Estimation of the growth of tree is not necessarily limited to calculation of growth equations, but it is also possible to use a table, showing the relationship between age of a tree and tree height and tree diameter.

It is also well known that population density of trees in a forest affects the growth of tree diameters. In general, when the population density of a forest is high, the tree diameter does not grow, and when the population density is low, growth of a tree diameters is accelerated.

(2) Subsequently, the relationship between a given age of trees and an average tree diameter of a forest, standard deviation of the tree diameter in a forest, and the minimum diameter in a forest is obtained. Furthermore, the number of trees having a tree diameter class are also obtained using an appropriate tree diameter distribution equation representing tree diameter distribution in a forest. It is desirable that the distribution curve obtained by the tree diameter distribution equation resembles an actual tree diameter distribution of an existing forest. When the forest is young, tree diameters can be represented by normal distribution. The tree diameter distribution of a normal aged forest is generally expressed by the Weibull distribution. When the tree diameter at the breast height is represented by d, and assuming x=d−a (a is a constant, and x>0), the Weibull distribution can be described by the equation (5) as shown below.

$$f(x) = 1 - \exp(-(x/b)^c) \quad (5)$$

where, a, b, and c are constants, and a is called a position parameter, b is called a scale parameter, and c is called a shape parameter, wherein a represents the smallest tree diameter in the plantation.

When the average value μ (which differs from the average tree diameter) of the Weibull distribution is expressed as μ=D−a, and the dispersion is σ², the average value and the dispersion can be expressed as follows.

$$\mu = b\Lambda(1 + 1/c) \quad (6)$$

$$\sigma^2 = b^2\{(\Lambda(1+2/c) - \Lambda^2(1+1/c)\} \quad (7)$$

In the above equations, $$\Lambda(s) = \int_0^\infty x^{s-1} e^{-x} dx,$$

D is the average tree diameter, and a, b, and c, are constants. If values of μ and σ² are known, the value c is determined for a certain value of a by the following equation, $$\sigma/\mu = \frac{\sqrt{\Lambda(1+2/c) - \Lambda^2(1+1/c)}}{\Lambda(1+1/c)} \quad (8)$$

and the parameter b is determined from equation (6). That is, once the average value, the dispersion, and the value of are known, the shape of the distribution can be determined by calculating the values of b and c. Λ (s) is a lamda function, and the lamda function is expressed by $$\Lambda(s) = \int_0^\infty x^{s-1} e^{-x} dx.$$

Since it is difficult to solve the above equation analytically, the value of the lamda function is obtained by the following approximate equation (9).

$$\Lambda(s) = 1 - 0.57710166(s-1) + 0.98585399(s-1)^2 - 0.87642182(s-1)^3 + 0.8328212(s-1)^4 - 0.5684729(s-1)^5 + 0.25482049(s-1)^6 + 0.0514993(s-1)^7 \quad (9)$$

In order to determine values of parameters a, b, and c in the above equation, which determine the shape of the distribution, known values including the average diameter D and the average tree height H at a tree age of t are used. When the parameters a, b, and c are determined, the standard deviation a and the minimum diameter a can be calculated according to the Weibull distribution function based on the average tree diameter D.

When the standard deviation a of the tree diameter is determined from the average tree diameter D, the standard deviation σ can be obtained by regressive analysis from the average diameter, because it is known that there is a linear relationship between the average diameter and the standard deviation a for a plurality of artificial plantation. That is, the relationship between the standard deviation σ and the average tree diameter D can be expressed by the approximation σ=m·D+n (where m and n are constants). Therefore, values for m and n can be determined from investigations of forests in existing afforestation and/or reforestation sites.

The standard deviation σ can be obtained not only by the primary regression analysis as described above, but also it can be determined from various relationships obtained by investigations of various pre-existing sites.

In forests where thinning has been implemented, because the pressing trees were removed, the minimum diameter becomes comparatively large; in forests, however, where thinning has not been implemented, many pressing trees remain and the minimum diameter remains small. Although the minimum diameter may affect the average diameter D, the shape of the tree size distribution, that is, the distribution coefficient can be determined at a constant value even when the average diameter D is set at a constant value.

Once the shape of the distribution has been determined, the area occupied by trees having diameters in one diameter class having diameters ranging from di to di+1 is obtained from the distribution function, and the number of trees in one diameter class is determined as the population density of trees in one diameter class. That is, the number distribution of trees determines the population density of trees in each tree diameters class per area (trees/ha).

(3) Subsequently, an appropriate relationship that indicates the tree diameter distribution of tree height at an optional tree age having a diameter in a diameter class is determined. Generally, since there is correlation between the tree diameter and the tree height, it is possible to estimate the tree heights and tree height curves from the tree diameter by use of an appropriate relational equation. Although many types of tree height curves including a linear function are developed, it is known from experience that an increase of the tree height gradually saturates as the tree age increases. Among many tree height curves, it is assumed that the relationship between the average tree height and the average tree diameter can be expressed by an equation shown below.

$$1/H = A + B/D \tag{10}$$

wherein, H is an average tree height, D is an average tree diameter, and A and B are constants. It is desirable to develop a method of determining these constants A and B based on the average tree diameter (D) and the average tree height (H) by investigations of pre-existing forests. As the results of investigations, the relationship between H and A can be expressed by an equation (11), $$A = a' + b'/H \text{(where, a' and b' are constants)} \tag{11}$$

It has been known from the regressive analysis of the average height H that the relationship between B and A can be expressed by an equation (12), $$B = a''/D + b''/H + C'' \text{(where, a'', b'', and c'' are constants)} \tag{12}$$

The constant A and B in the equation (10) can be estimated from the average tree diameter D and the average tree height H.

(4) Subsequently, using a standard trunk shape, a top diameter, a length, and a root diameter are calculated, assuming that a tree is cut and processed to a log.

The standard trunk shape is determined depending on each tree species and each tree age. However, investigations show that there is no big differences among tree species and the age, one tree shape can be selected as a standard shape. The tree shape can be expressed by n-dimensional curve, but normally, a three-dimensional curve is sufficient to express the standard tree shape. An example of calculation for obtaining log dimensions is described below.

In order to standardize trunk shape of various tree species, a tree height of 1.3 m is set at 1 and tree diameter of 1 m at the breast height is set at 1, the top of the tree height is set as the point of origin (0,0), and tree height is represented as x-axis in the direction from the tree top toward the root (ground), and the tree outside diameter is represented as y-axis in the radial direction, and it is assumed that the tree shape can be expressed by the following three dimensional curve, which passes the point of origin (0, 0) and the point of the standard diameter at the breast height (1, 0.5), as follows.

$$y = ax + bx^2 + cx^3 \tag{13}$$

Many logs are produced after cutting trees in the site, and the relationship between the tree height and the tree diameter at the breast height are measured, and the tree heights and tree diameters are plotted assuming that these measured values fulfill the following equations.

$$xi = hi/(H - 1.3) \tag{14}$$

$$yi = di/D \tag{15}$$

where, xi is a height of a log where the diameter is measured, and di is a diameter at the height of hi, and D is the height of the log at the breast height. A three dimensional equation is obtained by approximation calculation, and constants of a, b, and c of the three dimensional equation (13) are obtained by method of least squares.

The thus obtained three dimensional formula (13) expresses a relationship between the tree height and the tree diameters including bark of a tree.

(5) Subsequently, a tree diameter distribution at an given age is determined based on the relationship between an average diameter and the standard deviation of a tree diameter distribution and the minimum tree diameter in a plantation, and calculation is performed to obtain the number of trees included in one tree diameter class, and all of log volume that are obtained when trees included in one tree diameter class is harvested. Furthermore, the total log volumes for all tree diameter classes are determined by summation of log volumes for every tree diameter class over an entire range of the forest.

Since the relationship between the tree height Hi and the tree diameter Di at the breast height is known, it is possible to formulate a standard trunk shape, and the diameter of a log obtained from a tree can be calculated from the standard trunk shape. That is, the standard tree shape is multiplied by the tree height and the diameter is multiplied by the tree diameter at the breast height to determine the actual shape of this tree, and the tree diameter at a given height is determined by calculation. This tree is cut according to a conventional method, that is cut at every 4 meters from its root, so that the diameter and the log volume are calculated, and a the log volume is multiplied by the number of trees in a unit area of ha, and the log volume of one tree diameter class per ha is obtained. At this time, since the diameter of a tree include bark of a tree, the log volume is calculated from the diameter, from which the bark thickness is excluded. This is repeated from the minimum tree diameter Dmin at the breast height to the maximum tree diameters at the breast height Dmax, and total log volume per unit area of ha is obtained. By multiplying the total volume per unit area by the total area, the total log volume of an afforestation and/or reforestation site in one tree diameter class is determined. The whole selling price is obtained by multiplying the log volume for a diameter class and the selling price of the log having the diameter. Since the price often differs according to the log diameter, the selling price for each log diameter is calculated by multiplying the selling price by the number of trees having a log diameter in a unit area and the total selling price per unit area can be calculated by for a whole forest is obtained by adding all selling prices for all log diameters.

(6) Subsequently, the whole selling price is obtained by multiplying the total log selling price per unit area by the total area of an afforestation and/or reforestation site.

(7) When determining the log volume before and after thinning, calculation of the log volume is performed based on an assumption that the average tree diameter does not change before and after thinning, and the shape of the tree diameter distribution and the relationship between the tree diameter and the tree height after thinning are maintained as the same as those before thinning as described earlier, except that the number of trees has changed after thinning.

Thinning is often carried out during forest growing period. The object of thinning is to remove undesirable trees and to assist growth of remaining trees, while simultaneously earning intermediate income by thinned trees. Although growth of trees after thinning is normally excellent, the amount of growth is dependent on tree species, land shape, soil, amount of rainfall, and population density of trees after thinning. Because there is no general understanding as to the growth of trees after thinning, it is necessary to collect information by tests.

For convenience, the effects of thinning is calculated on an assumption that the average tree diameter before and after thinning does not change and only the population density changes by thinning large trees and small trees evenly, or by thinning equal amounts of large and small trees on both sides of the tree diameter distribution. The log volume obtained by thinning is estimated from the difference in the number of trees before and after thinning.

(8) Subsequently, it is assumed that all of the tree volumes corresponding to trees having the average tree diameter and the average tree height are harvested at the time of harvesting. It is also assumed that all of standing trees are cut at the time of harvesting, and the entire calculated volume of logs in a site is shipped in total.

(9) Subsequently, the above-described estimations are repeated, and growth simulation can be carried out for a tree species from planting, thinning, and harvesting. This simulation calculation is applied to a plurality of tree species, a growth of the log volume and a value of the forest is estimated. Consequently, the average tree height, the average tree diameter, distributions of the tree height and the tree diameter, the log volume, and selling price can be estimated. Even when the tree species is different, it is possible to estimate growth of a forest by applying an equal simulation equation but only changing values of parameters in the simulation equation depending on the tree species. Accordingly, a growth simulation can be applied to an afforestation and/or reforestation site that includes a plurality of tree species and it is possible to calculate log volume and log selling price totally by calculating those values for each tree species.

(10) Finally, when a plurality of tree species are grown in a site having an area, for example, of ten thousand ha, by repeating the sequence of planting, thinning, harvesting, it is possible to obtain an optimum combination of tree species and the planting area in order to maintain the plantation and to maximize the profit. In this case, profit, such as cost and selling prices and conditions to preserve the forest, are expressed by equality and inequality equations, and a combination to maximize the profit is obtained by linear programming method.

An afforestation and/or reforestation plan is established by linear programming for maximizing the profit by subtracting the cost from sales. An example of an afforestation and/or reforestation business plan will be described below. An afforestation and/or reforestation business is planned based on the assumption that n tree species are planted in a site having an area of 10000 ha, where no trees are standing, and an operating period of the afforestation and/or reforestation business is presumed for sixty years, and the operating period is divided into twelve divisional periods of five years from the first to the twelfth divisional period, and after harvesting, one tree species is selected for planting in the afforestation and/or reforestation site.

In the planning, a combination is searched that maximize the target variable by the linear programming method. The target variable is expressed by a formula as shown below.

$$\Sigma\Sigma\Sigma\{B_i, k \cdot V_i, k \cdot S_i, j, k + BT_i, k \cdot BT_i, k \cdot BR_i, k \cdot X_i, j, k - P_i, j, k - S_i, j, k - H_i, j, V_i, j\} \quad (16)$$

Where, $B_i$, $k$: log price per $m^3$ obtained by harvesting of one tree species i at an age k ($/m^3$), $V_i$, $k$: log volume per ha obtained by harvesting a tree species i at age k ($m^3$/ha), $S_i$, $j$, $k$: harvesting area for a tree species i at age of k in j-th divisional period at set variables (ha), $BT_i$, $k$: log price for logs obtained by thinning of a tree species i at age k ($/m^3$), $X_i$, $j$, $k$: area for cutting trees at the age of k for logs at j-th divisional period at total variables (ha), $P_i$, $j$: proper cost for planting a tree species i at j-th divisional period at total variables ($/ha), $H_i$, $j$: expenses for harvesting and transporting logs at j-th divisional period at total variables ($/m^3$), $BH_i$, $j$: expense for cost for thinning and transporting logs j-th divisional period at total variables ($/m^3$).

Moreover, limiting equations are generally attached to the above formula. For example, Planting trees all over the site of 10000 ha at the first divisional period, setting upper and lower limits for area for felling area, log volume and selling price, setting upper and lower limits for the log volume obtained from standing trees in the site, setting upper and lower limits for area for planting a tree species, and setting upper and lower limit for the amount of carbon dioxide (the amount of fixed carbon), which is obtained by the log volume and the density of logs.

When the profit of an afforestation and/or reforestation business is above a predetermined value, a factor other than the profit may be considered as a priority factor. For example, when an amount of fixed carbon in an afforestation and/or reforestation site can be determined, the amount of fixed carbon may be selected as a priority factor for evaluating an afforestation and/or reforestation business. If the amount of fixed carbon can be traded, the income obtained by trading the fixed carbon may be introduced into earning of an afforestation and/or reforestation business. Here, the above-described amount of fixed carbon is an increase of an accumulated carbon amount obtained through implementation of the afforestation and/or reforestation business for a predetermined period of time from the reference accumulated carbon amount at the time of starting the afforestation and/or reforestation business, and the amount of fixed carbon corresponds to the amount of carbon dioxide absorbed by trees in the afforestation and/or reforestation site during the business period, and the amount of fixed carbon is proportional to the amount of carbon dioxide absorbed during the afforestation and/or reforestation period. The amount of fixed carbon may be determined by subtracting the accumulated carbon amount at the time of starting the afforestation and/or reforestation from the accumulated carbon amount at the time of expiration of the business, or may be determined by totalizing the yearly amount of carbon dioxide absorbed by plantation in the business site year by year.

By carrying out the above-described simulation, an appropriate tree species for plantation and an appropriate plantation area for each site are determined, and the appropriate tree species and the appropriate area for the tree species will constitute a business plan for an afforestation and/or reforestation. The business planning portion 16 stores the business plan in the business plan database 17, and the business planning portion 16 divides the normal afforestation and/or reforestation business period (normally 30 years) into a plurality of divisional periods (for example, 30 divisional periods) and calculates change of the tree volume by growth of trees for every divisional period (for example, one year) and the change of the tree volume per each divisional period is stored in the business database 17. This change of the tree volume is stored in the business plan database 17 as the change of the amount of the accumulated carbon obtained by the calculation formula for determining the amount of fixed carbon.

Subsequently, after planning information has been input into the business plan database 17, the indirect effect estimation portion 18 reads planning information from the business plan database 17 and estimates indirect effects that will affect on the surrounding environment including the afforestation and/or reforestation site (step S4). In particular, negative effects which affect on the amount of the fixed carbon in the afforestation and/or reforestation site is estimated, since the afforestation and/or reforestation business is carried out for maximizing the amount of fixed carbon. Indirect effects include various types as shown below.

cutting trees for slash and burn agriculture,
cutting of trees for gathering wood,
cutting trees for gathering building materials,
illegal felling.

The indirect effects estimation portion 18 stores estimated numerical values of indirect effects that might affect the business plan database 17, wherein the numerical values are obtained by prior investigation, which indicate the scale and location dependency of indirect effects in the afforestation and/or reforestation site.

Subsequently, the risk prediction portion 19 reads planning information for planning a business plan from the business plan database 17, and predicts risks that will encounter while executing the business plan. (step S5). The risks include various types as shown below.

damage by insects,
damage by forest fire, and
damage by weather

The indirect effect estimation portion 18 stores the estimated indirect effects in the business plan database 17.

Subsequently, the risk prediction portion 19 stores numerical values of risks estimated by prior investigation, which indicate the scale and location dependency of the risks for respective afforestation and/or reforestation sites.

Subsequently, the risk prediction portion 19 stores the estimated risks in the business plan database 17.

Subsequently, the afforestation and/or reforestation business plan output portion 20 reads business plan information stored in the business plan database 17, and outputs an business plan to a display device (not shown) or to a local terminal 3 in the afforestation and/or reforestation site.

An afforestation and/or reforestation business plan has been completed and business operators engaged in the afforestation and/or reforestation business execute the afforestation and/or reforestation operations according to the afforestation and/or reforestation business plan (step S6).

It is noted, however, when indirect effects or risks in a potential site are estimated to be extremely high, it is preferable to review the business plan for reconstructing the business plan so that indirect effects and risks can be reduced.

Review of the afforestation and/or reforestation business plan will be carried out as described below, while executing the afforestation and/or reforestation operations according to the afforestation and/or reforestation business plan stored in the business plan database 17. The afforestation and/or reforestation operators in the site read a present condition of the afforestation and/or reforestation such as growth rate of the plantation, and the present condition is transmitted from the local terminal 3 to the center terminal 4 of the business system 1. The present condition of the afforestation and/or reforestation site received by the afforestation and/or reforestation business system 1 is transmitted to the business plan accomplishment assessment portion 23. The afforestation and/or reforestation business operator receives information concerning indirect effects from the local terminal 3, and the indirect effect information is sent to the business system 1. The indirect effect information is collected by the indirect effect information collecting portion 21, and further sent to the business plan accomplishment assessment portion 23.

The afforestation and/or reforestation operators receive risk information from the local terminal 3 and the risk information is sent to the business system 1. The risk information is received by the risk information collecting portion 22, and sent to the business plan accomplishment assessment portion 23.

When receiving information collected as described above, the business plan accomplishment assessment portion 23 assesses a degree of accomplishment of the business plan by comparing present conditions collected from various information collecting portions with the business plan information obtained from the business plan database 17 (step S7). The degree of accomplishment is determined, by obtaining the accumulated carbon amount at present as described earlier, and by comparing the accumulated carbon amount at present with an expected accumulated carbon amount, which is stored in the business plan database 17. The degrees of damages caused by indirect effects and risks are compared with the estimated damages.

The results of assessment regarding the degree of business accomplishment are output to a display device or printers (both are not shown) and also to the business plan review portion 24

The business review portion 24 reviews the business plan according to the result of assessment about the accomplishment degree, and reconstructs the business plan when the accomplishment degree is not sufficient. The business review portion 24 outputs possible reasons for the insufficient accomplishment degree to the display device or to a printer (not shown). When an operator in the afforestation and/or reforestation site receives the possible reasons, the operator estimates reasons for insufficient accomplishment with reference to the possible reasons, and estimated reasons are determined by the operator and transmitted to the business review portion 24 by a keyboard (not shown). When the business plan review portion 24 receives estimated reasons from the operator, the business plan review portion outputs countermeasures defined for respective reasons. The operator in the afforestation and/or reforestation site carries out necessary countermeasures (step S9). The business plan review portion updates the original business plan in the business plan database 17 when necessary (step S10).

Subsequently, the business review portion 24 stores the updated business plan in the business plan database 17. When the renewed business plan is stored in the business plan database 17, the indirect effect estimation portion 18 reviews the indirect effects by the above-described procedure, and the renewed indirect effects are stored in the business plan database 17. The risk prediction portion 19 reviews the influences of risks by the above-described procedure, and the renewed risks are stored in the business plan database 17.

The steps from S7 to S10 shown in FIG. 2 are repetitively carried out periodically until the end of an afforestation and/or reforestation business.

As described above, an afforestation and/or reforestation business plan can be devised easily based on the conditions of the surrounding forests and estimation of indirect effects and risks which might be caused in the afforestation and/or reforestation site obtained by prior investigation. In addition, since the present condition of the afforestation and/or reforestation and damages caused by indirect effects or risks are always monitored and assessed, it is possible to improve the afforestation and/or reforestation business plan based on the results of assessment, which results in reliably updating the business plan and successfully executing the afforestation and/or reforestation business at respective sites.

In the above explanation, the accumulated carbon amount or the amount of fixed carbon (corresponding to an increase of the accumulated carbon amount) is used as a parameter to evaluate the afforestation and/or reforestation business. However, it is also possible to use an amount of carbon dioxide that is absorbed by trees in the site as a parameter by converting the amount of fixed carbon into the amount of carbon dioxide. Since the amount of fixed carbon is proportional to the amount of carbon dioxide, the parameter representing the amount of fixed carbon may be substituted to the parameter representing the amount of absorbed carbon dioxide.

Furthermore, a program that realizes functions of respective functional portions in FIG. 1 may be stored in a computer readable recording medium and an afforestation and/or reforestation business can be executed by a computer system which includes the computer readable program that is stored in the computer readable medium. The "computer system" described above includes hardware such as OS and peripheral devices. When a WWW system is being used, the "computer system" includes a home page supplying environment (and display environment). In addition, the computer readable recording media refer to recording media such as flexible disc, an optical magnetic disc, a ROM, a CD-ROM, and to a memory devices such as a hard disc in the computer system. Furthermore, the "computer readable recording medium" comprises media that store a program for a fixed period of time, such as volatile memory RAM inside a computer system which plays a role for communicating a program between a server and a client through a network such as internet or a communication line such as telephone lines.

The above-described program may be transmitted from a computer system that stores the program in the memory to the other computer system through a transmission medium or through transmission waves in the transmission medium. Here, the "transmission medium" that transmits the program refers to a medium having a function for transmitting information, such as a network (communication network) such as telephone line system. The program may include a program for realizing a part of the above-described functions. Moreover, the programs may include a difference program that realizing the above-described functions by combining with programs that are ready stored in the computer system.

While preferred embodiments of the present invention have been described and illustrated above, it should be understood that these are examples of the present invention and are not to be considered as limiting. Additions, omissions, substitutions, and other modifications can be made without departing from the spirit or scope of the present invention. Accordingly, the invention is not to be considered as limited by the foregoing description but is only limited by the scope of the appended claims.

INDUSTRIAL APPLICABILITY

This invention relates to a system and program for planning and executing an afforestation and/or reforestation business in order to reduce emission of a greenhouse effect gas. The afforestation and/or reforestation business system includes a computer server for communicating information between a center terminal and each local terminal located at each afforestation and/or reforestation site, and has a planning database concerning a tree species, growing rate of tree size for each tree species, an indirect effects and risks that affect on the growth rate, and an estimation about the accumulated carbon amount and profit of the afforestation and/or reforestation business. The afforestation and/or reforestation business system also includes a business accomplishment assessment portion that assesses a degree of accomplishment of an afforestation and/or reforestation business site while carrying out afforestation and/or reforestation in terms of the amount of fixed carbon for updating the business plan to accomplish the business plan.

The invention claimed is:

1. An afforestation or reforestation business system comprising:
   a plurality of proposed afforestation or reforestation sites;
   a computer server in data communication with at least one terminal installed where the afforestation or reforestation is carried out, the computer server adapted to devise and evaluate an afforestation or reforestation business;
   a first database for storing records related to the afforestation or reforestation business;
   a second database for storing records related to tree species;
   an information-collection portion for collecting a diameter and a height of a tree located within a local region in at least one of the plurality of proposed afforestation or reforestation sites, wherein the diameters and heights are input into at least one terminal;
   an afforestation or reforestation site determining portion for evaluating the proposed sites using estimated tree carbon dioxide absorption amounts based on the tree diameter and height information;
   a comparing portion for selecting an afforestation or reforestation site from the plurality of proposed sites, wherein the selection includes comparing the estimated carbon dioxide amounts to a first threshold value;
   a planning portion for calculating a profit when a planting area in the selected afforestation or reforestation site and tree species records change, the planning portion including:
      selecting a tree species;
      selecting the planting area that can obtain the greatest profit, and
      storing the selected tree species, the planning area, and estimated value for growth change of the selected tree species in the first database; and
   an output portion for displaying said afforestation or reforestation business records on the at least one terminal.

2. The afforestation or reforestation business system according to claim 1, further comprising:
   indirect effect memory portion for storing information relating to an indirect effect of an environment of the selected afforestation or reforestation site and a scale value of the afforestation or reforestation obtained by prior investigations;
   risk memory portion for storing risk information relating to the environment of the selected afforestation or reforestation site and the scale value of the afforestation and/or reforestation obtained by prior investigations;
   indirect effect estimating portion for inputting a business value corresponding to the indirect effect and scale value, and for inputting from the first database and from the indirect effect memory portion and storing it in said business database; and
   risk estimating portion for inputting the business value of risks corresponding to the scale of the afforestation or reforestation business and the afforestation or reforestation site, read from the first database, from the risk memory portion, and stores the same in said first database.

3. The afforestation or reforestation business system according to claim 2, further comprising:
   indirect effect collecting portion for receiving and collecting, via the at least one terminal, condition information relating to the indirect effect estimates;
   risk collecting portion for receiving and collecting, via the at least one terminal, condition information relating to the risk estimates;
   business accomplishment assessment portion for receiving the condition information and comparing it with estimate values and business values and calculating a proportion of conditions with respect to said business; and
   business review portion for reviewing and revising the afforestation or reforestation business,
   wherein the indirect effect estimating portion and risk estimating portion are adapted to re-compute the indirect effect and the risk estimates when the business review portion revises the afforestation or reforestation business.

4. The afforestation or reforestation business system according to claim 1, further comprising
   a second threshold value that is smaller than the first threshold value, wherein if the tree carbon dioxides absorption amount is smaller than the first threshold value,
   wherein if the tree carbon dioxide absorption amount is smaller than the first threshold value and greater than the second threshold value, a forest is defined as the second class forest and is qualified as an afforestation or reforestation site for new afforestation or reforestation.

5. The afforestation or reforestation business system comprising:
   a plurality of proposed afforestation or reforestation sites;
   a computer server in data communication with at least one terminal installed where afforestation or reforestation is carried out, the computer server adapted to devise and evaluate an afforestation or reforestation business;
   a first database for storing records related to the afforestation or reforestation business;
   a second database for storing records related to a tree species;
   an information collection portion for collecting a diameter and a height of all trees located within a local region in a plurality of afforestation or reforestation candidate sites, wherein the diameters and heights are input into the at least one terminal;
   an afforestation or reforestation site determining portion for performing a predetermined calculation to determine an average tree carbon dioxide absorption amount per unit volume at a predetermined time in a plurality of afforestation or reforestation candidate sites based on the tree diameters and heights information;
   a selection portion for selecting a afforestation or reforestation candidate site from the plurality of afforestation or reforestation candidate sites by comparing the determined average tree carbon dioxide absorption amount per unit volume to a first threshold amount, selecting an afforestation or reforestation candidate site, and outputting the diameters and heights information of trees in the selected afforestation or reforestation candidate site;
   a first computing module adapted to receive the tree diameters and heights information and calculate future average diameters and heights;
   a second computing module adapted to determine a distribution of the number of trees and heights of trees corresponding to pre-selected tree diameters;
   a third computing module adapted to determine a volume of logs for each tree diameter per unit area of the selected afforestation or reforestation candidate site based on the determined distribution of the number of trees and heights of trees;
   a fourth computing module adopted to multiply a afforestation or reforestation site area by the determined volume of logs per unit area, thereby determine a volume of logs of the entire selected afforestation or reforestation site, and adapted to multiply the volume of logs of the entire selected afforestation or reforestation sites by a log price for each pre-selected tree diameter, thereby determining an economic value for the entire selected afforestation or reforestation sites;
   a computation portion for executing the first, second, third, and fourth computing modules for each type of tree stored in said second database to compute a second economic value of the entire selected afforestation or reforestation site volume changes, and for selecting a tree species and afforestation or reforestation site volume that obtains an optimal economic value determined by said fourth computing module, and for storing the selected tree species, a planting area, and an estimated value for growth change of the selected tree species in the first database; and
   a business output portion for displaying said afforestation or reforestation business records on the at least one terminal.

6. A computer-implemented afforestation or reforestation program for implementing the afforestation or reforestation business system according to claim 5.

7. A computer-implemented afforestation or reforestation business program operated on an afforestation or reforestation business system comprising a computer server in data communication with at least one terminal located at an afforestation or reforestation site, the computer server comprising a first database for storing afforestation or reforestation business information and a second database for storing tree species information, and wherein the computer server is adapted to analyze an afforestation or reforestation business, the afforestation or reforestation business program comprising:
   a condition information collecting module adapted to receive from the at least one terminal a diameter and a height of a tree located in a local region within a plurality of afforestation or reforestation candidate sites;
   an afforestation or reforestation site determining module adapted to determine a tree carbon dioxide absorption for each of the plurality of afforestation or reforestation candidates sites using the diameter and height of the tree information, wherein the afforestation or reforestation site determining module selects an afforestation or reforestation candidate site if the tree carbon dioxide absorption amount is smaller than a first threshold value;
   a business devising module adapted to determine a profit when a planning area within the selected afforestation or reforestation site and information about tree species within the selected afforestation or reforestation site are changed, and that is adapted to select the tree species and the planting area that maximize a profit, and is adapted to store the selected tree species, planting area, and an estimated values for growth changes of the tree species in the first database; and a business output module adapted to display the information stored in the first database on at least one terminal.

8. The afforestation or reforestation business program according to claim 7, further comprising a second threshold value that is smaller than the first threshold value, wherein if the tree carbon dioxide absorption amount is smaller than the first threshold value and greater than the second threshold value, a second class forest is cut and qualifies as an afforestation or reforestation site for new afforestation or reforestation.

9. The afforestation or reforestation business program according to claim 8, further comprising:

an indirect effect memory module adapted to store information relating to the indirect effects of an environment on the selected afforestation or reforestation site and a scale of the afforestation or reforestation obtained in a previous analysis;

a risk memory module adapted to store risk information related to the environment and the scale of the afforestation or reforestation obtained in a previous analysis;

an indirect effect estimating module for inputting the indirect effects information and storing the same in the first database; and a risk estimating module for inputting the risks information and storing the same in the first database.

10. The afforestation or reforestation business program according to claim 9, further comprising:

an indirect effect collecting module adapted to receive and collect indirect information from the at least one terminal;

a risk collecting module adapted to receive and collect risk information from the at least one terminal;

a business accomplishment assessment module adapted to receive indirect effect information and risk information from the condition information collecting module, the indirect effect information collecting module, and the risk information collecting module, and adapted to determine a status value; and a business review module adopted to store the status value in the first database if the afforestation or reforestation business is incomplete;

wherein the indirect effect estimating module and risk estimating module compute a revised indirect effect information and risk information.

11. A method for determining afforestation or reforestation site comprising the steps of:

(a) selecting a plurality of proposed afforestation or reforestation sites;

(b) providing a computer server in data communication with at least one terminal installed where afforestation or reforestation is carried out, the computer server adapted to devise and evaluate an afforestation or reforestation business;

(c) providing a first database for storing records related to the afforestation or reforestation business;

(d) providing a second database for storing records related to tree species;

(e) collecting a diameter and a height of a tree located within a local region in at least one of the plurality of proposed afforestation or reforestation sites;

(f) inputting the diameters and heights into at least one terminal;

(g) estimating tree carbon dioxide absorption amount based on tree diameter and height information;

(h) comparing the estimated carbon dioxide absorption amount to a first threshold value;

(i) selecting an afforestation or reforestation site from a plurality of proposed afforestation or reforestation sites based on the comparison step in step (h);

(j) calculating profit when a planting area in the selected afforestation or reforestation site and the tree species record change by, (k) selecting a tree species, (l) selecting the planting area that can obtain a maximum profit, and (m) storing the selected tree species, the planting area, and an estimated value for growth change of the selected tree species in the first database; and (n) displaying said afforestation or reforestation business records on the at least one terminal.

12. The method according to claim 11, further comprising the steps of:

(o) storing information relating to an indirect effect of an environment of the selected afforestation or reforestation site and a scale of the afforestation or reforestation obtained prior investigations;

(p) storing risk information relating to the environment of the selected afforestation or reforestation site and the scale value of the afforestation or reforestation obtained by prior investigations;

(q) inputting a business value corresponding to the indirect effect and scale value, and for inputting from the first database and from the indirect effect memory portion and storing it in said business database; and (r) inputting the business value of risks corresponding to the scale of the afforestation or reforestation business and the afforestation or reforestation site, read from the first database, from the risk memory portion, and stores the same in said first database.

13. A computer-implemented afforestation or reforestation business system comprising:

a plurality of proposed afforestation or reforestation sites defined by a geographical area;

at least one terminal located proximate the plurality of proposed afforestation or reforestation sites, wherein at least one terminal is adapted to receive information about at least one tree located within a portion of at least one of the plurality of proposed afforestation or reforestation sites;

a computer in data communication with the at least one terminal;

a first computation module adapted to compute a tree $CO_2$ absorption rate based on the information about the at least one tree;

a second computation module adapted to compare the $CO_2$ absorption rate to a predetermined value and select at least one afforestation or reforestation site from a plurality of proposed afforestation or reforestation sites;

a third computation module for calculating a profit based on the tree species in the selected afforestation or reforestation site, the third computation module receiving as input information a tree species, a size of a planting area within the selected afforestation or reforestation site that can obtain a maximum profit, and an estimated value for the growth change of the tree species; and an output for displaying at least the calculated result.

* * * * *